United States Patent
Chang et al.

(10) Patent No.: US 7,668,194 B2
(45) Date of Patent: Feb. 23, 2010

(54) DUAL SPEED INTERFACE BETWEEN MEDIA ACCESS CONTROL UNIT AND PHYSICAL UNIT

(75) Inventors: Luke Chang, Aloha, OR (US); Ilango S. Ganga, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 11/020,945

(22) Filed: Dec. 23, 2004

(65) Prior Publication Data

US 2005/0271064 A1  Dec. 8, 2005

Related U.S. Application Data

(63) Continuation-in-part of application No. 10/851,002, filed on May 21, 2004.

(51) Int. Cl.
*H04J 3/16* (2006.01)
*H04J 3/00* (2006.01)

(52) U.S. Cl. ........................................ 370/465; 370/474

(58) Field of Classification Search ................ 370/465, 370/474, 241, 469, 201, 419, 463, 464, 420, 370/296, 279, 216; 709/233
See application file for complete search history.

(56) References Cited

U.S. PATENT DOCUMENTS

| | | | | |
|---|---|---|---|---|
| 5,509,126 A | * | 4/1996 | Oprescu et al. | 710/307 |
| 5,541,957 A |   | 7/1996 | Lau | |
| 6,069,897 A | * | 5/2000 | Perlman et al. | 370/420 |
| 6,141,352 A |   | 10/2000 | Gandy | |
| 6,169,729 B1 | * | 1/2001 | Feuerstraeter | 370/296 |
| 6,222,852 B1 | * | 4/2001 | Gandy | 370/463 |
| 6,269,104 B1 | * | 7/2001 | McLaughlin et al. | 370/464 |
| 6,385,208 B1 | * | 5/2002 | Findlater et al. | 370/419 |
| 6,704,296 B1 | * | 3/2004 | Crayford et al. | 370/279 |
| 6,718,417 B1 |   | 4/2004 | Bachrach | |
| 6,983,342 B2 | * | 1/2006 | Helenic et al. | 710/305 |
| 7,343,425 B1 | * | 3/2008 | Lo et al. | 709/246 |

(Continued)

OTHER PUBLICATIONS

IEEE Std. 802.3 - 2000, Clauses 28, 36 and 37 pp. 699-744 and 962-1032.*

(Continued)

*Primary Examiner*—Aung S Moe
*Assistant Examiner*—Awet Haile
(74) *Attorney, Agent, or Firm*—Blakely, Sokoloff, Taylor & Zafman LLP

(57) ABSTRACT

A system and method to implement a dual speed network interface. A first code is transmitted from an initiator unit to a follower unit on a first output datapath ("OUT_DP") of multiple OUT_DPs coupling the initiator unit to the follower unit. The first code is transmitted to initiate a speed change of a link to a physical medium for communicating data. The first code is transmitted at a first datapath speed. A second code is received on a first input datapath ("IN_DP") of multiple IN_DPs coupling the follower unit to the initiator unit. The second code indicates to the initiator unit that the follower unit received the first code. The first OUT_DP is then placed into an idle state in response to receiving the second code. Subsequently, the first OUT_DP is enabled after the idle state at a second datapath speed different from the first datapath speed.

15 Claims, 11 Drawing Sheets

U.S. PATENT DOCUMENTS

| | | |
|---|---|---|
| 2002/0196736 A1 | 12/2002 | Jin |
| 2003/0217215 A1* | 11/2003 | Taborek et al. .............. 710/305 |
| 2004/0196074 A1* | 10/2004 | Sung .......................... 327/100 |
| 2004/0202198 A1* | 10/2004 | Walker et al. ............... 370/474 |
| 2005/0063310 A1* | 3/2005 | Caldwell et al. ............ 370/241 |
| 2005/0122897 A1* | 6/2005 | Gonda ........................ 370/216 |
| 2005/0259685 A1 | 11/2005 | Chang et al. |

OTHER PUBLICATIONS

PCT/US2005/046997, PCT International Search Report and Written Opinion, Jun. 21, 2006.

"IEEE Standards 802.3-2002®, Part 3: Carrier Sense Multiple Access with Collision Detection (CSMA/CD) Access Method and Physical Layer Specifications," *IEEE Computer Society*, Mar. 8, 2002, pp. xv-xxiv, 78-101.

"IEEE Standards 802.3ae™-2002, Part 3: Carrier Sense Multiple Access with Collision Detection (CSMA/CD) Access Method and Physical Layer Specifications, Amendment: Media Access Control (MAC) Parameters, Physical Layers, and Management Parameters for 10 Gb/s Operation," *IEEE Computer Society*, Aug. 30, 2002, pp. viii-xi, 2-8, 285-316.

"IEEE Standards 802.3ae™-2002, Part 3: Carrier Sense Multiple Access with Collision Detection (CSMA/CD) Access Method and Physical Layer Specifications, Amendment: Media Access Control (MAC) Parameters, Physical Layers, and Management Parameters for 10 Gb/s Operation," *IEEE Computer Society*, Aug. 30, 2002, pp. 45-63, 156-227, 289-310.

IEEE, Std. 802.3—2000, Clauses 28, 36, 37, 4 pages.

Williamsen, Erica et al., "8802-3/ 802.3 Revision Request 1078", Jul. 8, 2001, UNH InterOperability Lab, 2 pages.

* cited by examiner

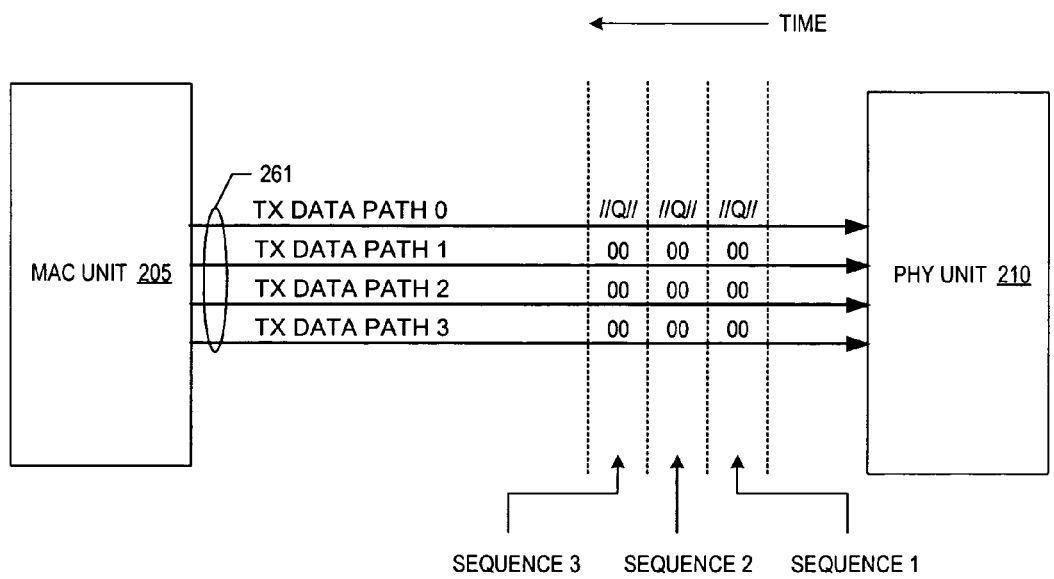

DUAL SPEED INTERFACE BETWEEN MEDIA ACCESS CONTROL UNIT AND PHYSICAL UNIT

CROSS-REFERENCE TO RELATED APPLICATIONS

This application is a continuation-in-part of prior application Ser. No. 10/851,002 entitled, "DUAL SPEED INTERFACE BETWEEN MEDIA ACCESS CONTROL UNIT AND PHYSICAL UNIT" filed on May 21, 2004.

TECHNICAL FIELD

This disclosure relates generally to networking, and in particular but not exclusively, relates to a media access control ("MAC") unit to physical ("PHY") unit interface for coupling to 10 GBASE-T and 1000BASE-T networks.

BACKGROUND INFORMATION

Computer networks are becoming an increasingly important aspect of personal and professional life. Networks are used for a wide variety of services including audio, video, and data transfer. As such there is a need for ever-faster networks providing greater bandwidth. Gigabit Ethernets ("GigE") have been developed to service this need for bandwidth. The Institute of Electrical and Electronics Engineers ("IEEE") Standard 802.3ab-1999 defines a 1000 Mbps Ethernet (1000BASE-T) that operates over a four pair twisted copper Category 5 wire. The IEEE Standard 802.3ae-2002 defines a 10 Gbps Ethernet (10GBASE-X/R) that operates over a fiber cable.

Optical fiber networks have been developed to operate at 10 Gbps bandwidth using a 10 Gbps fiber interface (XFI) or a 10 Gbps attachment unit interface (XAUI) having media access control ("MAC") devices that are coupled directly to an optics devices to convert the electrical signals to optical signals for transmission over the optical fiber network. However, current optical devices do not have the intelligence necessary for dual speed use.

Currently, there are no dual mode devices capable of interchangeably coupling to both 1 Gbps and a 10 Gbps networks. Such crossover devices are available for coupling to 10 Mbps and 100 Mbps Ethernets. These devices are referred to as 10/100 Ethernet devices. However, there is a market need for higher speed crossover devices, such as those operating at the 1 Gbps/10 Gbps bandwidths.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5A is a definition table illustrating a datapath naming convention from an initiator unit's perspective, in accordance with an embodiment of the invention.

FIG. 5B is a definition table illustrating a datapath naming convention from a follower unit's perspective, in accordance with an embodiment of the invention.

FIG. 6 is a block diagram illustrating a //Q// code sequence, in accordance with an embodiment of the invention.

DETAILED DESCRIPTION

Embodiments of a system and method for a dual speed network interface capable of interfacing with 1000BASE-T and 10GBASE-T networks are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
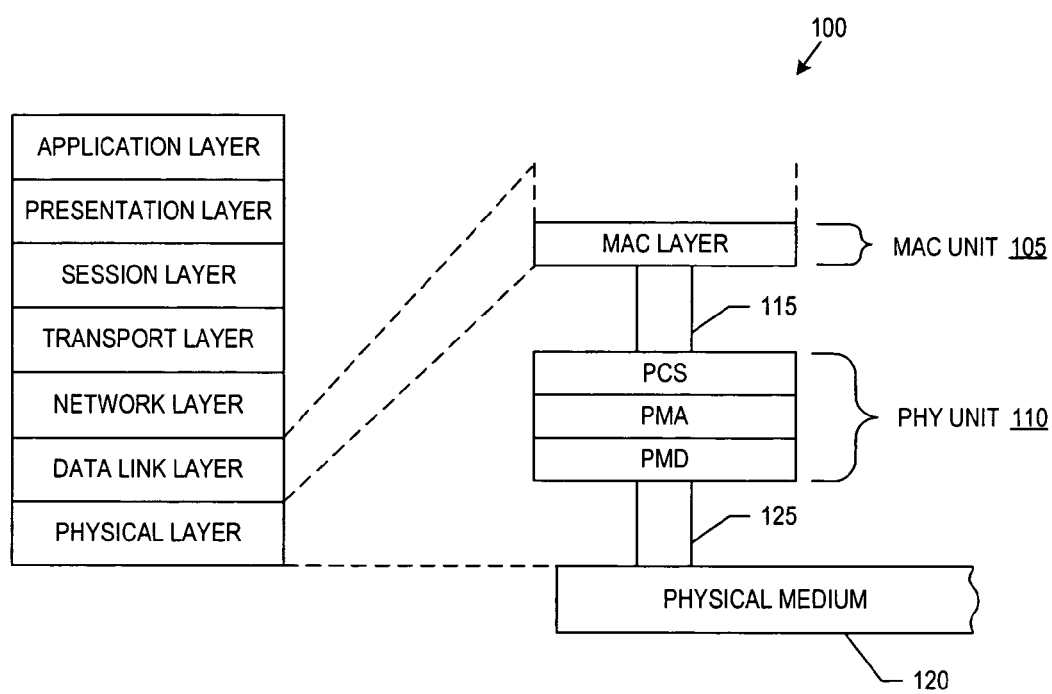
FIG. 1 is a block diagram illustrating the architecture of a dual speed network interface, in accordance with an embodiment of the invention.

FIG. 1 is a block diagram illustrating the architecture of a dual speed network interface 100, in accordance with an embodiment of the invention. The illustrated embodiment of dual speed network interface 100 includes a media access control ("MAC") unit 105 and a physical ("PHY") unit 110.

With reference to the seven-layer Open System Interconnect ("OSI") Reference Model developed by the International Standards Organization ("ISO"), MAC unit 105 implements MAC layer functionality. The MAC layer is a sublayer of the data link layer. The data link layer is primarily concerned with transforming a raw transmission facility into a communication line free of undetected transmission errors for use by the network layer. The data link layer accomplishes this task by breaking input data into data frames, transmitting the data frames sequentially, and processing acknowledgement frames. The MAC sublayer provides additional functionality concerned with controlling access to broadcast networks (e.g., Ethernet). In the case of Ethernet architecture, the MAC sublayer may implement a Carrier Sense Multiple Access with Collision Detection ("CSMA/CD") protocol.

MAC unit 105 is coupled to PHY unit 110 via a bi-directional link 115 to provide a datapath between MAC unit 105 and PHY unit 110. Bi-directional link 115 is often referred to as a Media Independent Interface ("MII"), an xMII in the case of implementations of 100 Mbps or higher, X attachment unit interface ("XAUI") in the case of 10 Gbps implementations, or X fiber interface ("XFI") in the case of dual path 10 Gbps implementations.

PHY unit 110 implements physical layer functionality. The physical layer is primarily concerned with transmitting raw bits over physical medium 120, which may be some form of network. PHY unit 110 is coupled to physical medium 120 via a media dependent interface ("MDI") 125. PHY unit 110 may further implement the functionality of various sublayers of the physical layer including a physical coding sublayer ("PCS"), a physical medium attachment ("PMA") layer, and a physical medium dependent ("PMD") layer.

Physical medium 120 may include an optical fiber, a twisted pair conductor, or the like. In one embodiment, physical medium 120 is a four pair twisted conductor, such as copper, conforming to a Category 5, 6, 7 or the like cable. In this four pair twisted conductor embodiment, PHY unit 110 converts digital data received from MAC unit 105 (e.g., 1000BASE-X, 10GBASE-X) into analog symbols (e.g., 1000BASE-T, 10GBASE-T) for transmission over physical medium 120. For example, PHY unit 110 may encode the digital data using Manchester encoding or the like. Physical medium 120 may operate at any number of bandwidths including, for example, 1 Gbps and 10 Gbps. In one embodiment, physical medium 120 is capable of interchangeably operating at both 1 Gbps and 10 Gbps using the 1000BASE-T and 10GBASE-T standards.

Figure 2:
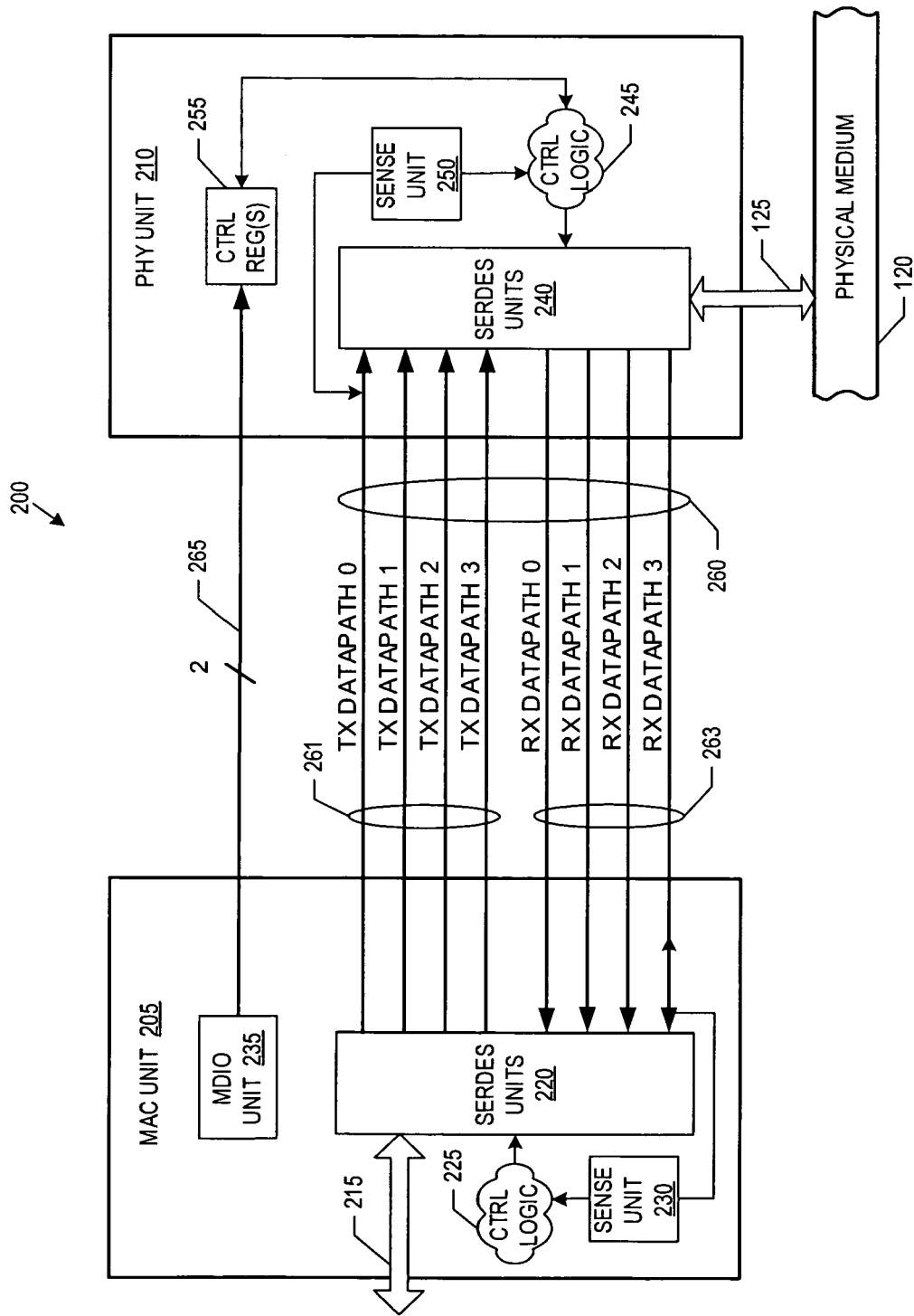
FIG. 2 is a block diagram illustrating a dual speed network interface, in accordance with an embodiment of the invention.

FIG. 2 is a block diagram illustrating a dual speed network interface 200, in accordance with an embodiment of the invention. Dual speed network interface 200 represents one embodiment of dual speed network interface 100. The illustrated embodiment of dual speed network interface 200 includes a MAC unit 205 and a PHY unit 210. MAC unit 205 includes a data input/output ("I/O") 215, serializer/deserializer ("SERDES") units 220, control logic 225, a sense unit 230, and a management data input/output ("MDIO") unit 235. PHY unit 210 includes SERDES units 240, control logic 245, a sense unit 250, control registers 255, and MDI 125. MAC unit 205 is coupled to PHY unit 210 with bi-directional link 260 having four transmit datapaths ("TXDPs") 261 (e.g., TXDP 0, 1, 2, 3) and four receive datapaths ("RXDPs") 263 (e.g., RXDP 0, 1, 2, 3). MDIO unit 235 is further communicatively coupled to control registers 255 via a two-lane MDIO bus 265.

The components of dual speed network interface 200 are interconnected as follows. SERDES units 220 are coupled to data I/O 215 to send and receive data thereon. SERDES units 220 serialize data receive from data I/O 215 onto each of TXDPs 261 and deserialize data received from RXDPs 263 onto data I/O 215. Data I/O 215 may be a data bus of a computer, such as a peripheral component interconnect ("PCI") bus, PCI Express bus, or the like. Data I/O 215 represents any I/O path providing data thereon and typically will be a parallel datapath wider than each direction of bi-directional link 260. SERDES units 240 serialize the data received on TXDPs 261 for transmission over physical medium 120. SERDES units 240 further deserialize data received from physical medium 120 for transmission over RXDPs 263 to MAC unit 205.

Sense unit 230 is coupled to each of RXDPs 263 to sense whether RXDPs 263 are currently in an idle state or an active state. Sense unit 230 is further coupled to sense whether RXDPs 263 are operating in a slow speed or a fast speed. Similarly, sense unit 250 is coupled to each of TXDPs 261 to sense whether TXDPs 261 are currently in an idle state or an active state and whether TXDPs 261 are operating in a slow speed or a fast speed.

Control logic 225 is coupled to sense unit 230 to receive one or more signals indicating whether RXDPs 263 are idle or active and operating at the slow speed or the fast speed. In turn, control logic 225 is coupled to SERDES units 220 to instruct SERDES units 220 when to idle (e.g., disable) or activate (e.g., enable) TXDPs 261 and when to transition TXDPs 261 from the slow speed to the fast speed or visa versa. How and when control logic 225 instructs SERDES units 220 is described in detail below.

Control logic 245 is similarly coupled to sense unit 250 to receive one or more signals indicating whether TXDPs 261 are idle or active and operating at the slow speed or the fast speed. Control logic is further coupled to SERDES units 240 to instruct SERDES units 240 when to idle or activate RXDPs 263 and when to transition RXDPs 263 from the slow speed to the fast speed or visa versa. Control logic 245 is further coupled to control registers 255 to access the contents of control registers 255 and act accordingly. For example, control registers 255 may contain control data indicating what speed (e.g., slow speed or fast speed) PHY unit 210 should startup at upon a reset or other power cycle event. MDIO unit 235 is coupled to control registers 255 via MDIO bus 265 to write control data thereto. How and when control logic 245 instructs SERDES units 240 is described in the processes below.

It should be appreciated that the illustrated embodiments of MAC unit 205 and PHY unit 210 may include other known components not illustrated. One of ordinary skill in the art having the benefit of the instant description will understand these known components have been excluded from FIG. 2 for the sake of clarity so as not to detract from the instant description.

Figure 3:
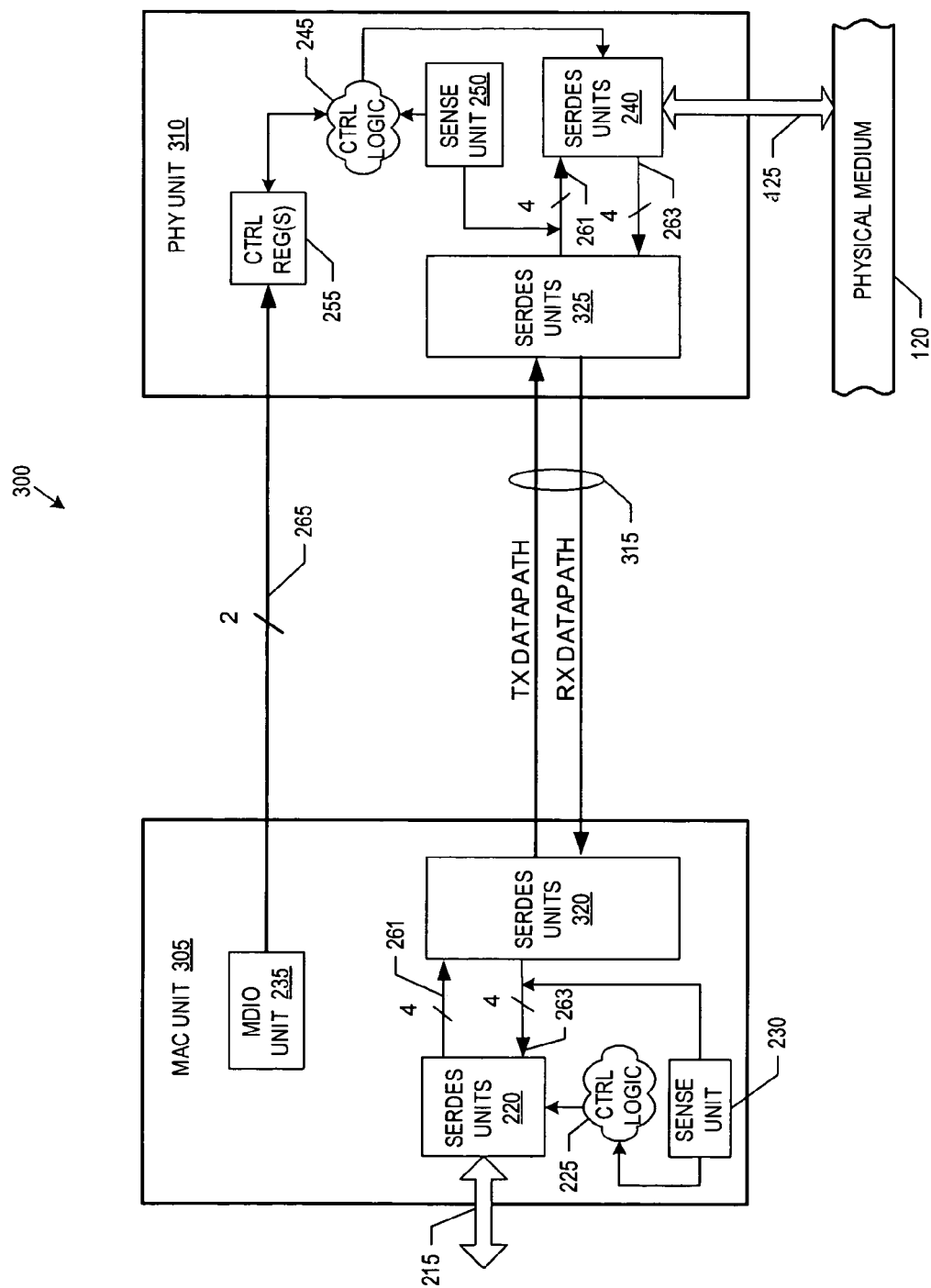
FIG. 3 is a block diagram illustrating a dual speed network interface having a two lane datapath coupling a media access control ("MAC") unit to a physical ("PHY") unit, in accordance with an embodiment of the invention.

FIG. 3 is a block diagram illustrating a dual speed network interface 300, in accordance with an embodiment of the invention. Dual speed network interface 300 represents another embodiment of dual speed network interface 100. The illustrated embodiment of dual speed network interface 300 includes a MAC unit 305 and a PHY unit 310 coupled together with a bi-directional link 315.

Dual speed network interface 300 is similar to dual speed network interface 200 with the exception that bi-directional link 315 is a two-lane datapath as opposed to an eight-lane datapath, and MAC unit 305 includes an additional SERDES unit 320 and PHY unit 310 includes an additional SERDES unit 325. SERDES units 320 and 325 function to further multiplex the eight datapaths of TXDPs 261 and RXDPs 263 onto the two datapaths of bi-directional link 315. Coupling the datapaths of MAC unit 305 to the datapaths of PHY unit 310 using only two datapaths saves valuable real estate on a circuit board, in an embodiment where MAC unit 305 and PHY unit 310 are discrete components, or on a die, in an embodiment where MAC unit 305 and PHY unit 310 are components of an integrated circuit. In one embodiment, bi-directional link 315 operates using XFI protocols while operating in the fast speed mode of operation (e.g., 10 Gbps).

Figure 4:
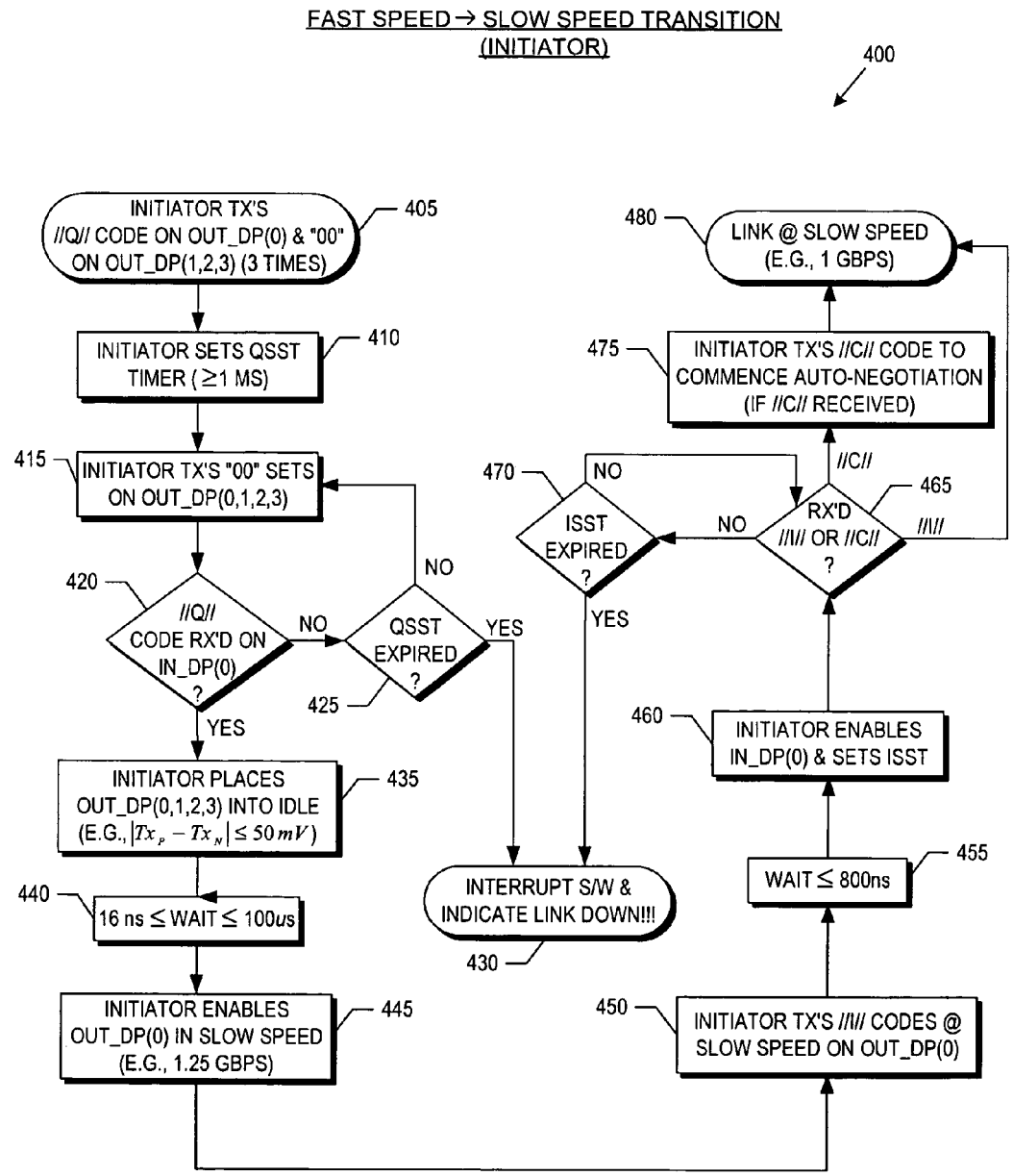
FIG. 4 is a block diagram illustrating a process for an initiator unit to initiate a link speed change from a fast speed to a slow speed, in accordance with an embodiment of the invention.

FIG. 4 is a block diagram illustrating a process 400 for an initiator unit to initiate a link speed change from a fast speed to a slow speed, in accordance with an embodiment of the invention. Although the processes described below are illustrated with reference to dual speed network interface 200, it should be appreciated that they are equally applicable to embodiments of dual speed network interfaces 100 and 300.

Either one of MAC unit 205 or PHY unit 210 may initiate a speed change of the link (i.e., MDI 125) to physical medium 120. The one of MAC unit 205 and PHY unit 210 initiating the speed change is referred to as the "initiator unit," while the one of MAC unit 205 and PHY unit 210 following the lead of the initiator unit is referred to as the "follower unit." FIG. 5A illustrates a definition table providing a naming convention from an initiator unit's perspective. When MAC unit 205 is the initiator unit, TXDPs 261 are referred to as initiator output datapaths(0,1,2,3) or INIT_OUT_DPs(0,1,2,3) and RXDPs 263 are referred to as initiator input datapaths(0, 1,2,3) or INIT_IN_DPs(0,1,2,3). When PHY unit 210 is the initiator unit, TXDPs 261 are referred to as INIT_IN_DPs(0,1,2,3) and RXDPs 263 are referred to as INIT_OUT_DPs(0,1,2,3). This naming convention from the initiator unit's perspective is applicable to processes 400 and 700 described below.

Beginning with a process block 405 in FIG. 4, dual speed network interface 200 is operating in a fast speed mode of operation. During the fast speed mode of operation, all of TXDPs 261 and RXDPs 263 (also referred to as INIT_OUT_DPs(0,1,2,3) and INIT_IN_DPs(0,1,2,3) with reference to the initiator unit) are operational. In one embodiment, the fast speed mode of operation provides a link speed between PHY unit 210 and physical medium 120 of 10 Gbps (e.g., 10GBASE-T), while each lane of the datapaths between MAC unit 205 and PHY unit 210 operate at 3.125 Gbps. In process block 405, the initiator unit (either MAC unit 205 or PHY unit 210) transmits a code sequence on INIT_OUT_DP (0) to the follower unit. In one embodiment, the code sequence is a link status code transmitted three times on INIT_OUT_DP(0) as an ordered set. This ordered set of the link status code is illustrated in FIG. 6. The code sequence is an indication that the initiator unit is about to break link (e.g., change the link speed of MDI 125). In one embodiment, the link status code is a //Q// code defined in clause 48 of the IEEE Standard 802.3ae™-2002. At the same times as transmitting the code sequence of //Q// codes, the initiator unit also transmits "00" data sets on INIT_OUT_DPs(1,2,3).

After transmitting the code sequence and the "00" data sets, the initiator unit sets a //Q// set symbol timer ("QSST") (process block 410). In one embodiment, the QSST is set for at least 1 ms. Once the code sequence has been transmitted and the QSST set, the initiator unit commences transmission of "00" data sets on all output datapaths INIT_OUT_DPs(0, 1,2,3) (process block 415). The initiator unit continues to transmit the "00" data sets until the initiator unit receives a //Q// code from the follower unit on the initiator unit's INIT_IN_DP(0) (decision block 420) or the QSST has expired (decision block 425). If the QSST expires prior to receiving a //Q// code, then the initiator unit will assert an interrupt to control software to indicate that the follower unit is not responding (e.g., the link is down) (process block 430).

However, if the initiator unit does receive a //Q// code on its INIT_IN_DP(0) prior to the QSST expiring, then process 400 continues to a process block 435. In process block 435, the initiator unit places INIT_OUT_DPs(0,1,2,3) into an idle state. In one embodiment, the idle state is an electrical idle state where the peak-to-peak amplitude of electrical signals on the line is no more than a specified voltage (e.g., 50 mV). In one embodiment, the idle state is a high impedance state where the output drivers within the initiator unit driving each of INIT_OUT_DPs(0,1,2,3) are placed into high impedance (e.g., shut off). The initiator unit should maintain INIT_OUT_DPs(0,1,2,3) in the idle state for a predetermined period of time (process block 440). In one embodiment, the initiator unit maintains OUT_DP(0,1,2,3) in an idle state for a minimum of 16 ns (or 50 unit intervals at 3.125 Gbps per datapath lane) and a maximum of 100 μs.

After waiting the predetermined period of time, in a process block 445, the initiator unit enables INIT_OUT_DP(0) and operates INIT_OUT_DP(0) in the slow speed mode of operation (e.g., 1.25 Gbps SERDES mode compatible with IEEE 802.3, Clause 36 or compatible with the Serial Gigabit Media Independent Interface ("SGMII")). Once operating in the slow speed mode of operation, the initiator transmits another link status code to indicate that INIT_OUT_DP(0) is up and running again (process block 450). In one embodiment, this link status code is an //I// code or /K28.5/IDLE code as defined by IEEE 802.3, Clause 36.

After a maximum delay period, such as 800 ns (process block 455), the initiator unit enables INIT_IN_DP(0) by enabling its receiver coupled to INIT_IN_DP(0) to detect activity on INIT_IN_DP(0). At approximately the same time, the initiator unit also sets an IDLE code set symbol timer ("ISST"). In one embodiment, the ISST is set to 80 μs.

The ISST will continue to count down until the initiator unit receives one to three consecutive //I// codes or //C// codes (configuration code used for auto-configuration when operating at 1 Gbps) (decision block 465) or until the ISST expires (decision block 470). If the ISST expires without receiving an //I// code or a //C// code on INIT_IN_DP(0), then the initiator unit issues an interrupt to the management layer software indicating the follower is not responding (e.g., link down interrupt). In response, the management layer software may pull control registers 255 in PHY unit 210 or other relevant registers within MAC unit 205 to determine the status of the communication link.

However, if the initiator unit does receive //I// codes, then the initiator unit asserts a link up indication to the management layer software to indicate the initiator unit is ready to commence operating in the slow speed mode of operation (e.g., 1 Gbps full duplex mode with physical medium 120) (process block 480). If the initiator unit receives a //C// code, then the initiator will transmit back a //C// code on INIT_OUT_DP(0) to commence auto-negotiation pursuant to the IEEE 802.3 Standard, Clause 37 or SGMII (process block 475), and then assert a link up indication to the management layer software once auto-negotiation is complete (process block 480).

Figure 7:
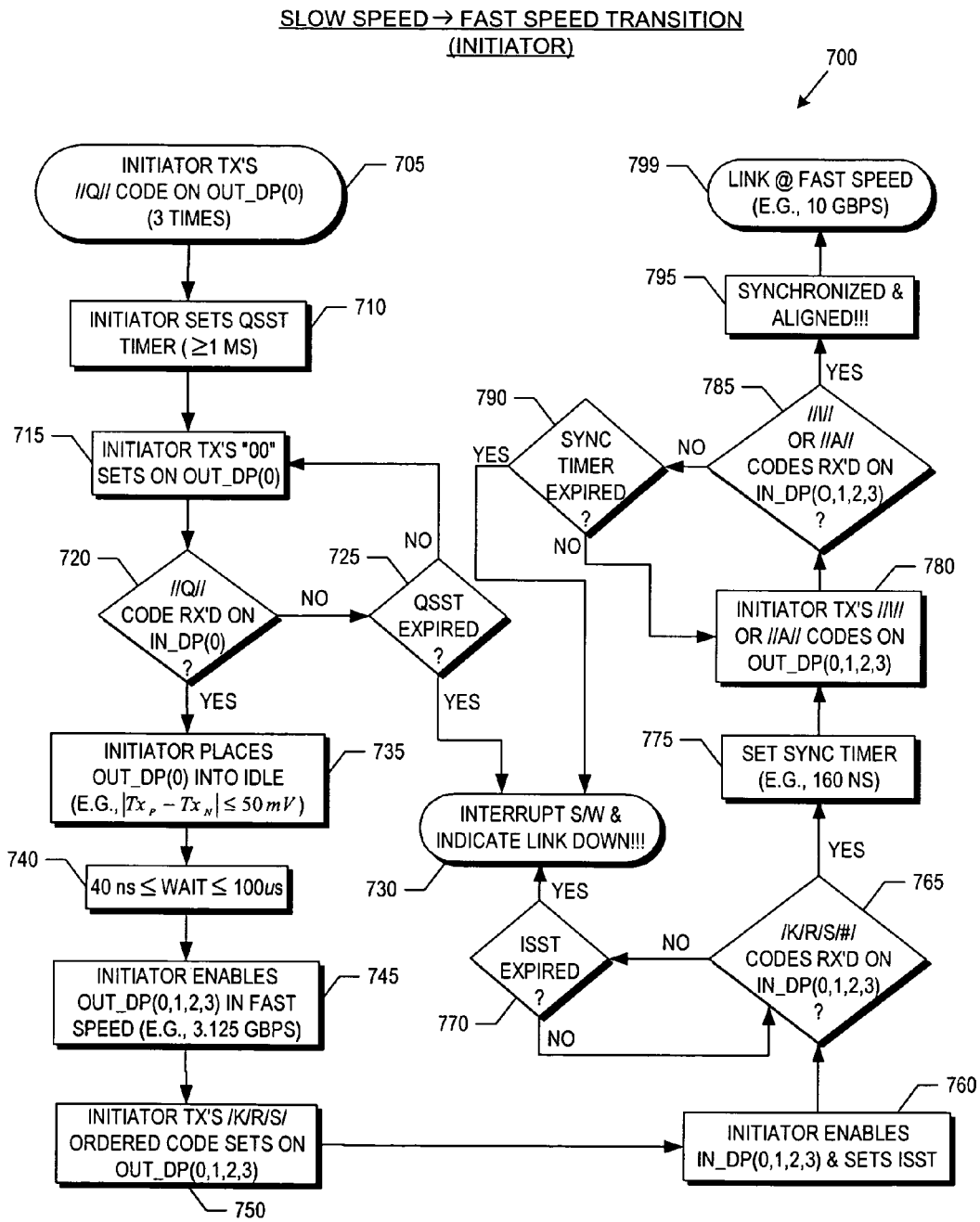
FIG. 7 is a flow chart illustrating a process for an initiator unit to initiate a link speed change from a slow speed to a fast speed, in accordance with an embodiment of the invention.

FIG. 7 is a flow chart illustrating a process 700 for an initiator unit to initiate a link speed change from a slow speed to a fast speed, in accordance with an embodiment of the invention. Beginning with a process block 705, dual speed network interface 200 is operating in a slow speed mode of operation. During the slow speed mode of operation, only TXDP(0) and RXDP(0) are operational. In one embodiment, the slow speed mode of operation provides a link speed between PHY unit 210 and physical medium 120 of 1 Gbps (e.g., 1000BASE-T), all though MAC unit 205 and PHY unit 210 communicate over INIT_OUT_DP(0) and INIT_IN_DP (0) at 1.25 Gbps. The additional bandwidth between MAC unit 205 and PHY unit 210 is consumed by link overhead.

In process block 705, the initiator unit (either MAC unit 205 or PHY unit 210) transmits the //Q// code sequence on INIT_OUT_DP(0) to the follower unit three times. After transmitting the //Q// code sequence the initiator unit sets QSST (process block 710) and then commences transmitting "00" data sets on INIT_OUT_DP(0) (process block 715). The initiator unit continues to transmit the "00" data sets until the initiator unit receives a //Q// code from the follower unit on INIT_IN_DP(0) (decision block 720) or the QSST expires (decision block 725). If the QSST expires prior to receiving a //Q// code, then the initiator unit will assert an interrupt to the management layer software to indicate that the follower unit is not responding (e.g., the link is down) (process block 730).

However, if the initiator unit does receive a //Q// code on INIT_IN_DP(0) prior to the QSST expiring, then process 700 continues to a process block 735. In process block 735, the initiator unit places its OUT_DP(0) into the idle state (e.g., electrical idle or high impedance). The initiator unit maintains INIT_OUT_DP(0) in the idle state for a predetermined period of time (process block 740). In one embodiment, the predetermined period of time is 50 unit intervals (or 40 ns at 1.25 Gbps operation).

After waiting the predetermined period of time, in a process block 745, the initiator unit enables INIT_OUT_DPs(0, 1,2,3) and operates INIT_OUT_DPs(0,1,2,3) in the fast speed mode of operation (e.g., 3.125 Gbps per datapath). Once the output drivers within the initiator for driving INIT_OUT_DPs(0,1,2,3) are enabled, the initiator transmits a /K/R/S/LANE # code sequence on each lane of INIT_OUT_DPs(0,1,2,3). As defined by the IEEE 802.3 Standard, Clause 48, these codes are /K28.5/K28.0/k27.7/LANE #. Table 1 below illustrates the code sequence for each lane of INIT_OUT_DPs(0,1,2,3).

TABLE 1

| LANE NUMBER | CODE SEQUENCE |
| --- | --- |
| 0 | /K28.5/K28.0/K27.7/00 |
| 1 | /K28.5/K28.0/K27.7/01 |
| 2 | /K28.5/K28.0/K27.7/02 |
| 3 | /K28.5/K28.0/K27.7/03 |

After a maximum delay from enabling INIT_OUT_DPs(0, 1,2,3) (e.g., 320 ns), the initiator unit enables INIT_IN_DPs (0,1,2,3) by enabling its receivers coupled to the input datapaths and sets its ISST (process block 760). In one embodiment, the ISST is set for 32 μs. In a decision block 765, the initiator unit will monitor each of INIT_IN_DPs(0,1,2,3) for a reciprocated /K/R/S/LANE # transmitted from the follower unit. If the ISST expires prior to receiving the /K/R/S/LANE # code sequence on each of INIT_IN_DPs(0,1,2,3) (decision block 770), then the initiator unit asserts an interrupt to the management layer software indicating the follower unit is not responding. In response, the management layer software should intervene to determine the problem.

If the /K/R/S/LANE # code sequence is received, the initiator unit sets a synchronize timer for a predetermined period of time (e.g., 160 ns) (process block 775) and transmits //I// codes or //A// codes to synchronize and align bi-directional link 260 (process block 780). An //A// code is a special alignment character per IEEE 802.3 Standard, Clause 48. If an //I// code or an //A// code is not received from the follower unit on INIT_IN_DPs(0,1,2,3) (decision block 785) prior to the synchronization timer expiring (decision block 790), then the interrupt is asserted in process block 730. If the //I// code or //A// code is received in decision block 785, then bi-direction link 260 is synchronized and aligned (process block 795) and ready for operation in the fast speed mode of operation (process block 799).

Figure 8:
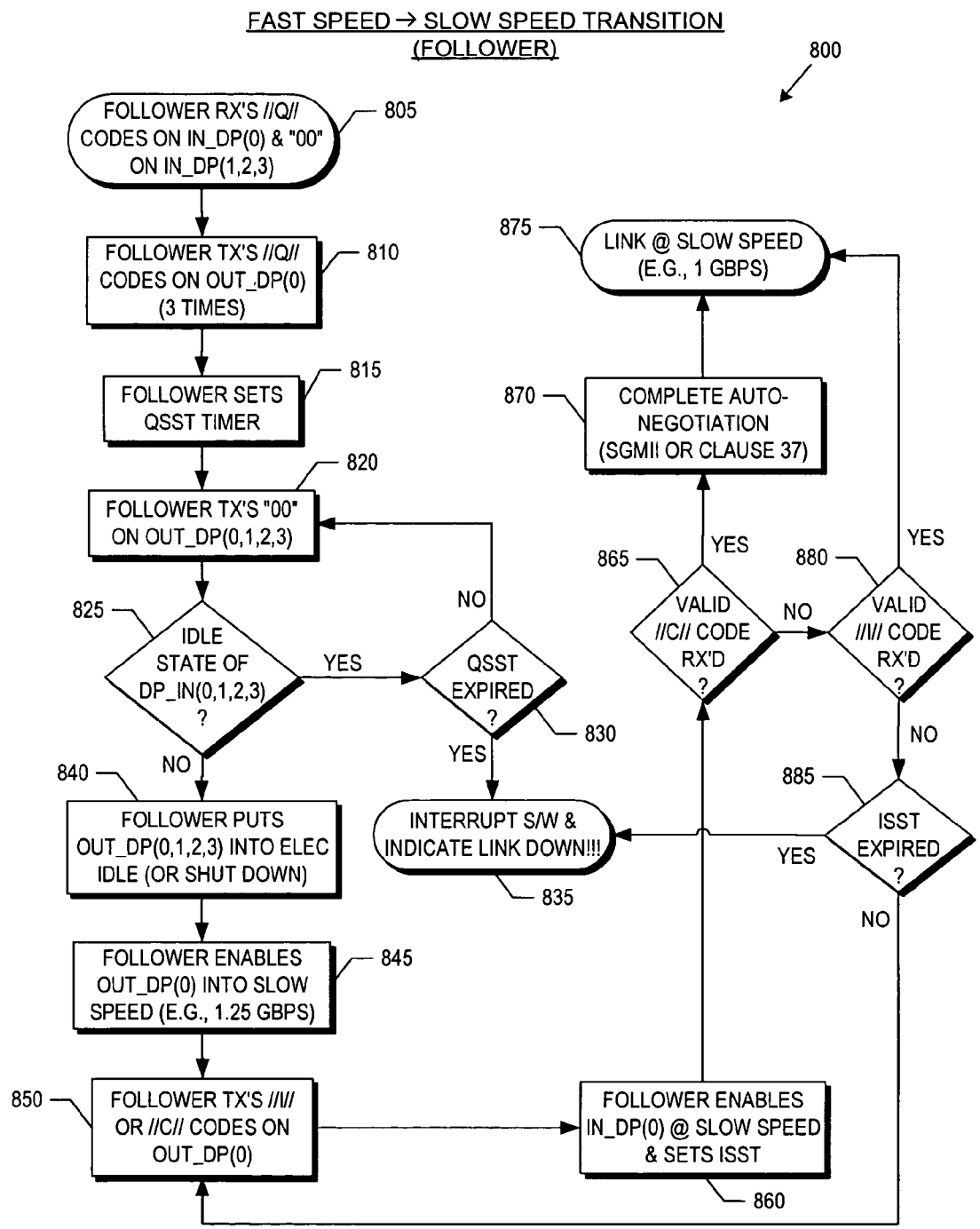
FIG. 8 is a flow chart illustrating a process for a follower unit to follow a link speed change from a fast speed to a slow speed, in accordance with an embodiment of the invention.

FIG. 8 is a flow chart illustrating a process 800 for a follower unit to follow a link speed change from a fast speed to a slow speed, in accordance with an embodiment of the invention. As mentioned above, either one of MAC unit 205 or PHY unit 210 may initiate a speed change of the link (e.g., MDI 125) to physical medium 120. As such, either one of MAC unit 205 and PHY unit 210 may follow the initiator unit and therefore be a follower unit. Referring to FIG. 5B, the naming convention from the follower unit's perspective is applicable to processes 800 and 900 described below. When MAC unit 205 is the follower unit, TXDPs 261 are referred to as follower output datapaths(0,1,2,3) or FOL_OUT_DPs(0, 1,2,3) and RXDPs 263 are referred to as follower input datapaths(0,1,2,3) or FOL_IN_DPs(0,1,2,3). When PHY unit 210 is the follower unit, TXDPs 261 are referred to as FOL_IN_DPs(0,1,2,3) and RXDPs 263 are referred to as FOL_OUT_DPs(0,1,2,3).

Beginning with process block 805, dual speed network interface 200 is operating in a fast speed mode of operation. During the fast speed mode of operation, all of TXDPs 261 and RXDPs 263 are operational. In process block 805, the follower unit receives at least one of the three //Q// code sequences transmitted by the initiator unit on FOL_IN_DP(0) (which corresponds to INIT_OUT_DP(0)) and the "00" data sets on the FOL_IN_DPs(1,2,3).

In response to receiving a //Q// code sequence, the follower unit transmits the //Q// code sequence on FOL_OUT_DP(0) (process block 810). In one embodiment, the follower unit transmits the //Q// code sequence three times. After the first //Q// code sequence is transmitted by the follower unit, the follower unit sets its QSST (process block 815). In one embodiment, the QSST is set to 1 ms.

After transmission of the //Q// code sequences, the follower unit also commences transmitting "00" data sets on all of FOL_OUT_DPs(0,1,2,3) (process block 820). The follower unit will continue to transmit "00" data sets until either the QSST expires (decision block 830) or the follower unit senses that FOL_IN_DPs(0,1,2,3) have entered the idle state (i.e., the initiator unit has placed INIT_OUT_DPs(0,1,2,3) into the idle state) (decision block 825). Sensing that FOL_IN_DPs(0,1,2,3) have entered the idle state may be determined by sensing that valid data (e.g., "00" data sets) is no longer being received on FOL_IN_DPs(0,1,2,3), by sensing that FOL_IN_DPS(0,1,2,3) have entered electrical idle, by sensing that FOL_IN_DPs(0,1,2,3) have entered a high impedance state, by sensing both the lack of valid data on FOL_IN_DPs(0,1,2,3) followed by an electrical idle state, or by sensing both the lack of valid data on FOL_IN_DPs(0,1, 2,3) followed by a high impedance state.

If the QSST expires prior to sensing an idle state of FOL_IN_DPs(0,1,2,3), then the follower unit asserts an interrupt to the management layer software (process block 835). If the follower unit does sense an idle state on each FOL_IN_DPs(0,1,2,3) (decision block 825), the follower unit proceeds to put FOL_OUT_DPs(0,1,2,3) into the idle state (process block 840). In one embodiment, the follower unit maintains FOL_OUT_DPs(0,1,2,3) in the idle state for a minimum of 16 ns and a maximum of 100 μs.

In a process block 845, the follower unit enables FOL_OUT_DP(0) in the slow speed mode of operation. Upon enabling FOL_OUT_DP(0), the follower unit transmits //I// code sequences, followed by //A// code sequences to commence auto-negotiation. Alternatively, the follower unit may transmit the //A// code sequences without first transmitting the //I// code sequences to immediately commence auto-negotiation. Within a determined period of time from enabling FOL_OUT_DP(0), the follower unit enables FOL_IN_DP(0) (process block 860). In one embodiment, the maximum delay between enabling FOL_OUT_DP(0) (process block 845) and enabling FOL_IN_DP(0) (process block

860) is 800 ns. Enabling FOL_IN_DP(0) may simply require enabling the receiver circuitry coupled to FOL_IN_DP(0).

If a //C// code sequence is received on FOL_IN_DP(0) (decision block 865), then process 800 proceeds to a process block 870 to complete auto-negotiation procedures pursuant to SGMII or the IEEE 802.3 standard, Clause 37. Once auto-negotiation is complete in process block 870, the follower unit is ready to send and receive data on TXPDs 261 and RXDPs 263 with the initiator unit in the slow speed mode of operation (process block 875).

Returning to decision block 865, if the follower unit does not receive a //C// code sequence, but instead does receive an //I// code sequence (decision block 880), then process 800 enters the slow speed mode of operation (process block 875) without executing an auto-negotiation process pursuant to SGMII or the IEEE 802.3 standard, Clause 37. However, if the follower unit receives neither a //C// code sequence nor an //I// code sequence prior to the ISST expiring (decision block 885), then the follower unit issues a software interrupt to the management layer software.

Figure 9:
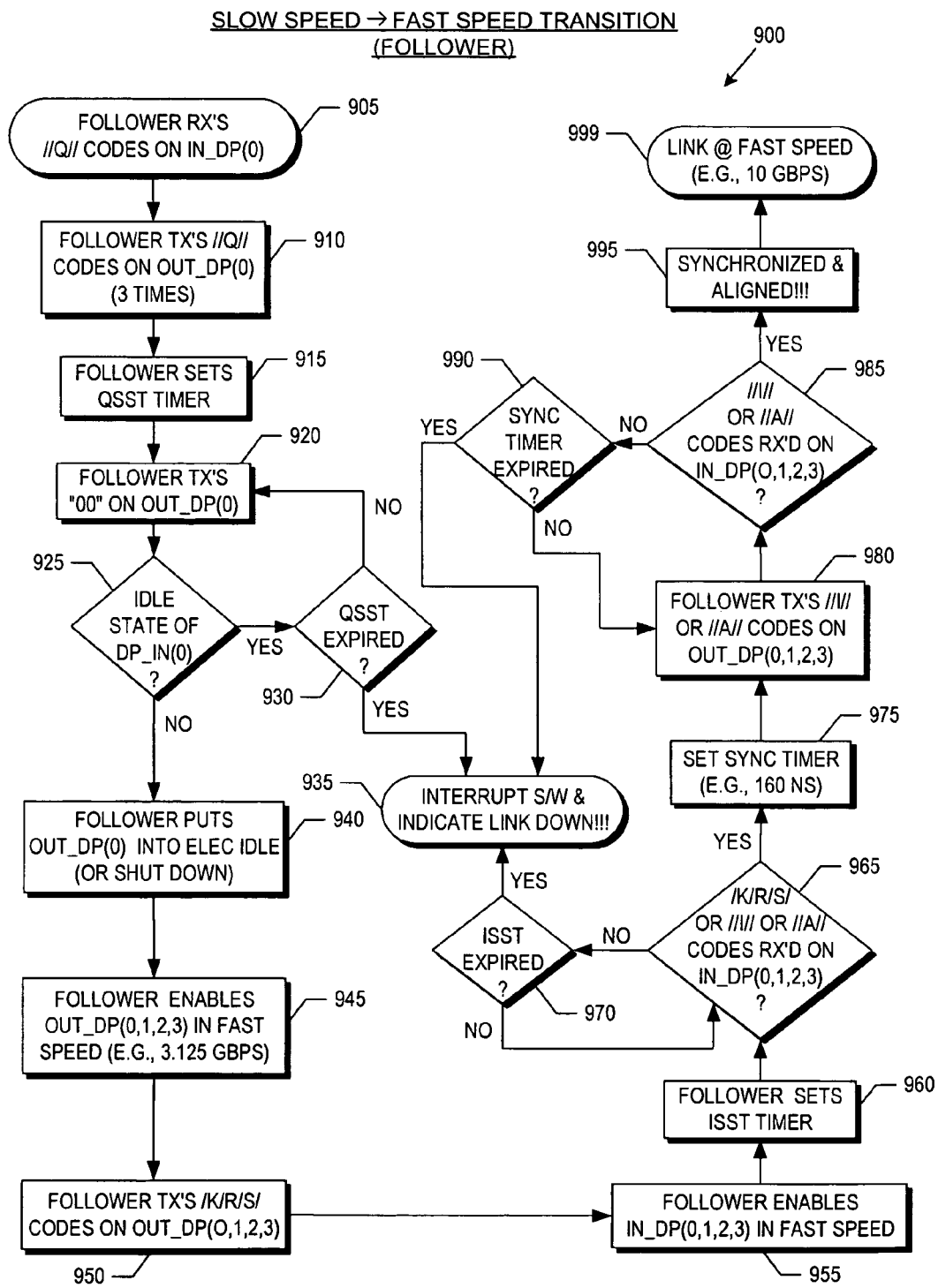
FIG. 9 is a flow chart illustrating a process for a follower unit to follow a link speed change from a slow speed to a fast speed, in accordance with an embodiment of the invention.

FIG. 9 is a flow chart illustrating a process 900 for a follower unit to follow a link speed change from a slow speed to a fast speed, in accordance with an embodiment of the invention. Beginning with a process block 905, dual speed network interface 200 is operating in a slow speed mode of operation. During the slow speed mode of operation, only TXDP(0) and RXDP(0) are operational.

In process block 905, the follower unit receives at least one of the three //Q// code sequences transmitted by the initiator unit on FOL_IN_DP(0) (which corresponds to INIT_OUT_DP(0)). In response to receiving a //Q// code sequence, the follower unit transmits the //Q// code sequence on FOL_OUT_DP(0) (process block 910). In one embodiment, the follower unit transmits the //Q// code sequence three times to ensure at least one //Q// code sequence is received by the initiator unit. After the first //Q// code sequence is transmitted by the follower unit, the follower unit sets its QSST (process block 915). In one embodiment, the QSST is set to 1 ms.

After transmission of the //Q// code sequences and setting the QSST, the follower unit also commences transmitting "00" data sets on FOL_OUT_DP(0) (process block 920). The follower unit will continue to transmit "00" data sets until either the QSST expires (decision block 930) or the follower unit senses that FOL_IN_DP(0) has entered the idle state (i.e., the initiator unit has placed INIT_OUT_DPs(0) into the idle state) (decision block 925). Sensing that FOL_IN_DP(0) has entered the idle state may be determined by sensing that valid data (e.g., "00" data sets) is no longer being received on FOL_IN_DP(0), by sensing that FOL_IN_DP(0) has entered electrical idle, by sensing that FOL_IN_DP(0) has entered a high impedance state, or a sub-combination of the three.

If the QSST expires prior to sensing an idle state of FOL_IN_DP(0), then the follower unit asserts an interrupt to the management layer software (process block 935). If the follower unit does sense an idle state on FOL_IN_DP(0) (decision block 925), the follower unit proceeds to shut down FOL_OUT_DP(0) or place it into the idle state (process block 940). In one embodiment, the follower unit maintains FOL_OUT_DP(0) in the idle state for a minimum of 40 ns and a maximum of 100 µs.

In a process block 945, the follower unit enables FOL_OUT_DPs(0,1,2,3) in the fast speed mode of operation (e.g., 3.125 Gbps per datapath lane). Upon enabling FOL_OUT_DPs(0,1,2,3), the follower unit transmits the /K/R/S/LANE # code sequence (process block 950), described above in connection with Table 1, on each lane of FOL_OUT_DPs(0,1,2,3). After a maximum delay from enabling FOL_OUT_DPs(0,1,2,3) (e.g., 320 ns), the follower unit enables FOL_IN_DPs(0,1,2,3) by enabling its receivers coupled to the input datapaths in the fast speed mode of operation (process block 955). In a process block 960, the follower unit sets its ISST. In one embodiment, the ISST is set for 32 µs. In a decision block 965, the follower unit monitors each of FOL_IN_DPs(0,1,2,3) for a reciprocated /K/R/S/LANE # transmitted from the initiator unit. If the ISST expires prior to receiving the /K/R/S/LANE # code sequence on each of FOL_IN_DPs(0,1,2,3) (decision block 970), then the follower unit asserts an interrupt to the management layer software indicating the initiator unit is not responding. In response, the management layer software should intervene to determine the problem.

If the /K/R/S/LANE # code sequence is received, the follower unit sets a synchronize timer for a predetermined period of time (e.g., 160 ns=500 UI at 3.125 Gbps per datapath lane) (process block 975) and transmits //I// codes or //A// codes to synchronize and align bi-directional link 260 with the initiator unit (process block 980). If an //I// code or an //A// code is not received from the follower unit on FOL_IN_DPs(0,1,2,3) (decision block 985) prior to the synchronization timer expiring (decision block 990), then the interrupt is asserted in process block 935. If the //I// code or //A// code is received in decision block 985, then bi-direction link 260 is synchronized and aligned (process block 995) and ready for operation in the fast speed mode of operation (process block 999).

Figure 10:
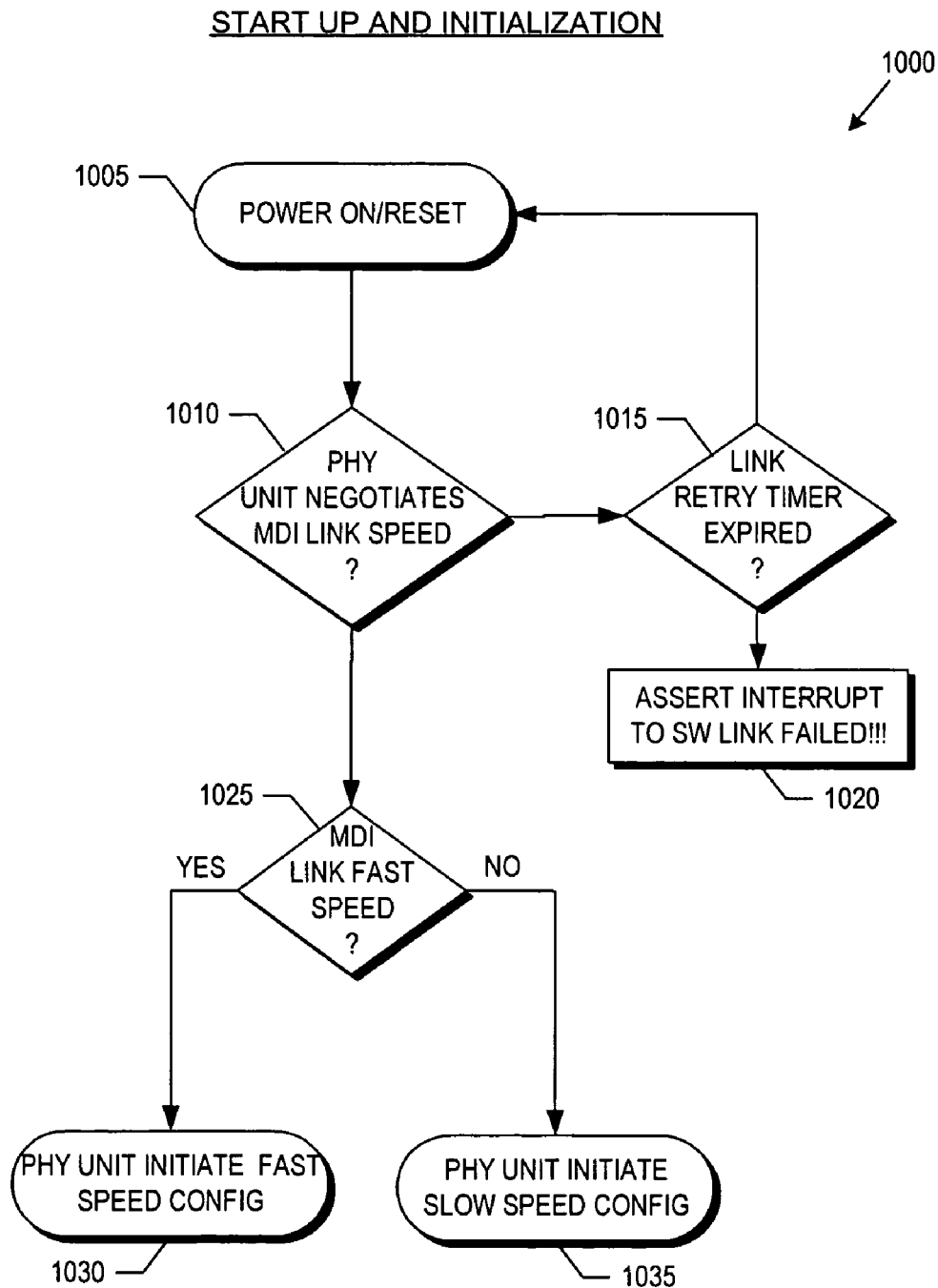
FIG. 10 is a flow chart illustrating a start up sequence of a dual speed network interface to determine a link speed to a physical medium, in accordance with an embodiment of the invention.

FIG. 10 is a flow chart illustrating a start up sequence 1000 for dual speed network interface 200 to determine the link speed to physical medium 120, in accordance with an embodiment of the invention. In a process block 1005, dual speed network interface 200 is reset or otherwise power cycled. In a process block 1010, PHY unit 210 negotiates the link speed of MDI 125 with physical medium 120 (also referred to as the line side). If PHY unit 210 fails to negotiate a line side link speed, within a specified period of time (decision block 1015), then PHY unit 210 issues an interrupt to the management layer software (process block 1020).

However, if the line side link speed is successfully negotiated in decision 1010, then process 1000 continues to decision block 1025. If the line side link speed was determined to be in the fast speed mode of operation, then process 1000 continues to a process block 1030, to configure dual speed network interface 200 into the fast speed mode of operation, as described above, with PHY unit 210 acting as the initiator unit. If the line side link speed was determined to be in the slow speed mode of operation, then process 1000 continues to a process block 1035, to configure dual speed network interface 200 into the slow speed mode of operation, as described above, with PHY unit 210 acting as the initiator unit.

Figure 11:
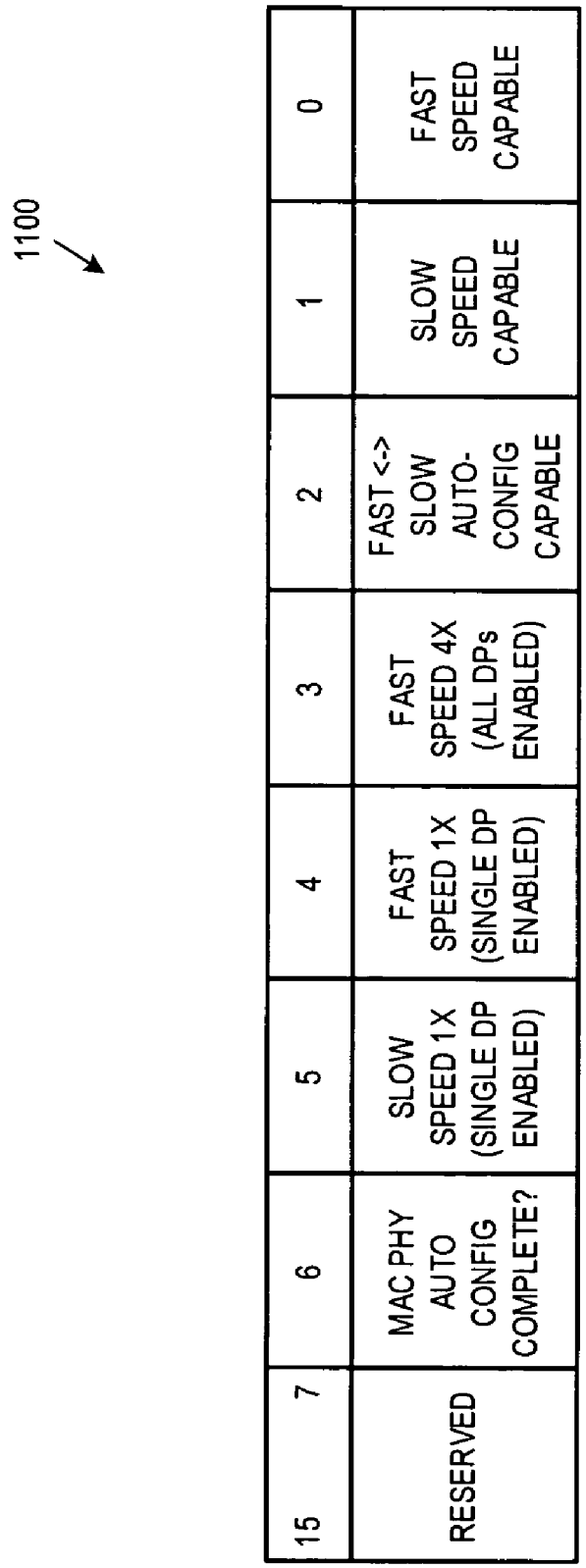
FIG. 11 illustrates a status register for communicating capabilities and status information between a PHY unit and a MAC unit, in accordance with an embodiment of the invention.

FIG. 11 illustrates a status register 1100 for communicating capabilities and status information between PHY unit 210 and a MAC unit 205, in accordance with an embodiment of the invention. During operation, MAC unit 205 may execute MDIO writes into control registers 255 to reconfigure PHY unit 210 or to initiate a link speed change, as described above. In one embodiment, status register 1100 is included within control registers 255 to indicate the capabilities of PHY unit 210 and the current operational status of PHY unit 210 to MAC unit 205. Status register 1100 enables software to interface with the hardware. In one embodiment, status register 1100 is accessible in address space defined by the IEEE 802.3 Standard, Clause 45.

Bits 0 and 1 are provided to indicate whether PHY unit 210 is either fast speed capable, slow speed capable, or both. Bit 3 indicates whether PHY unit 210 is capable of an auto-configuration transition between the fast speed and the slow speed mode of operation. Bits 3, 4, and 5 indicate whether all four datapaths in each direction are enabled during the fast speed mode of operation, whether only one datapath in each direction is enabled during the fast speed mode of operation (e.g., dual speed network interfaces 300 conforming to XFI electrical specifications and protocols), and whether only one datapath in each direction is enabled during the slow speed mode of operation. Bit 6 indicates whether a transition between the slow speed and the fast speed modes of operation has completed or is currently in process. Finally, bits 7 through 15 are recommended to be reserved for future use, upgrades, and add-on features.

Transitioning dual speed interfaces 100, 200, or 300 between the fast speed and the slow speed modes of operation may be initiated manually under the control of software. This may be executed by software notifying PHY unit 210 of an desired speed, which then updates status register 1100 to reflect the desired speed change. PHY unit 210 may then issue an interrupt to MAC unit 205 via control registers 255. The software may then direct MAC unit 205 to read status register 1100 to determine the new speed and then initiate the speed change as described above with MAC unit 205 acting as the initiator unit.

Figure 12:
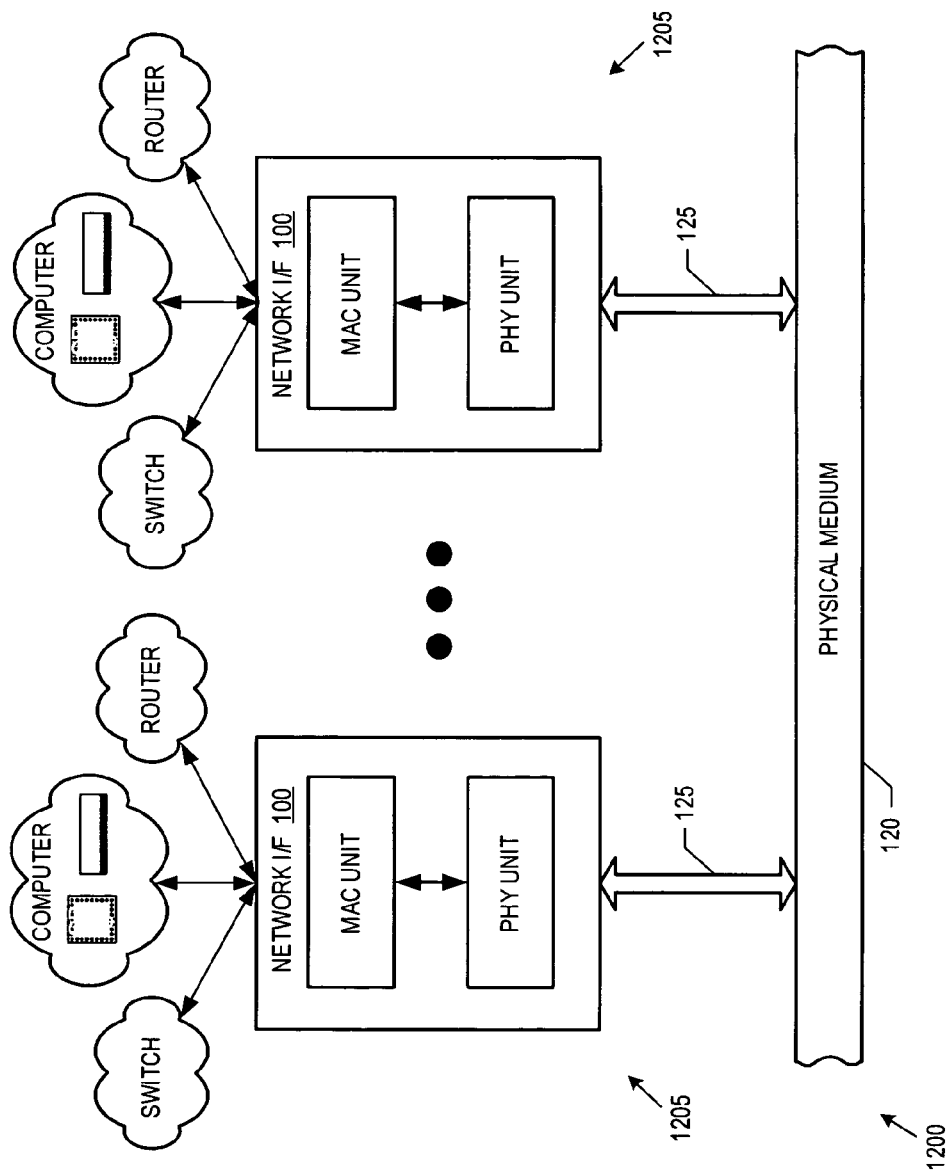
FIG. 12 is a block diagram illustrating a system including multiple network devices coupled to a physical medium via dual speed network interfaces, in accordance with an embodiment of the invention.

FIG. 12 is a block diagram illustrating a system 1200 including multiple network devices 1205 coupled to physical medium 120 using dual speed network interfaces 100, in accordance with an embodiment of the present invention. As discussed above, dual speed network interfaces 100 may be implemented as either one of dual speed network interface 200 or 300.

System 1200 illustrates how dual speed network interfaces 100 may be used to couple any number of devices to physical medium 120, including for example, a switch, a router, a computer including a central processing unit ("CPU") and system memory, and the like. The computer may represent a client or a server. Dual speed network interfaces 100 enable a single device to be coupled to either a slow speed network (e.g., 1 Gbps) or a fast speed network (e.g., 10 Gbps) without having to replace or switch the network interface. Furthermore, dual speed network interfaces 100 enable the speed of physical medium 120 to be changed during operation without having to disconnect network devices 1205. Accordingly, embodiments of the present invention provide a dual speed network interface capable of operating at 1 and 10 Gbps over a four pair twisted conductor using 1000BASE-T (Gigabit Ethernet) and 10GBASE-T (10 Gigabit Ethernet) protocols.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   transmitting a first code through a bi-directional interface from an initiator unit to a follower unit on a first output datapath ("OUT_DP") of multiple OUT_DPs of the bi-directional interface coupling the initiator unit to the follower unit, the first code to initiate a speed change of a link to a physical medium for communicating data, the first code transmitted at a first datapath speed;
   receiving a second code on a first input datapath ("IN_DP") of multiple IN_DPs of the bi-directional interface coupling the follower unit to the initiator unit, the second code indicating to the initiator unit that the follower unit received the first code;
   placing the first OUT_DP into an idle state in response to receiving the second code;
   enabling the first OUT_DP after the idle state at a second datapath speed different from the first datapath speed;
   transmitting the data from the initiator unit to the follower unit along all of the multiple OUT_DPs when the link speed with the physical medium is operating in a fast speed mode; and
   transmitting the data from the initiator unit to the follower unit along only the first OUT_DP and idling the remaining OUT_DPs when the link speed with the physical medium is operating in a slow speed mode relative to the fast speed mode,
   wherein the initiator unit comprises either one of a physical layer ("PHY") unit to couple to the physical medium or a media access control ("MAC") unit and the follower unit comprise an alternative one of the PHY unit or the MAC unit.

2. The method of claim 1, wherein the idle state comprises one of an electrical idle state and a high impedance state.

3. The method of claim 1, wherein the fast speed mode comprises a 10 Gigabit per second mode of operation for communicating the data with the physical medium and wherein the slow speed mode comprises a 1 Gigabit per second mode of operation for communicating the data with the physical medium.

4. The method of claim 1, wherein the first datapath speed is faster than the second datapath speed, and further comprising placing all of the multiple OUT_DPs into the idle state in response to receiving the second code.

5. The method of claim 1, wherein the first datapath speed is slower than the second datapath speed, wherein the multiple OUT_DPs other than the first OUT_DP are in the idle state during transmission of the first code, and further comprising enabling all of the multiple OUT_DPs at the second datapath speed after the idle state.

6. The method of claim 1, wherein placing the first OUT_DP into the idle state in response to receiving the second code comprises placing the first OUT_DP into the idle state for a predetermined period of time in response to receiving the second code, and further comprising:
   sensing the idle state of the first OUT_DP at the follower unit;

placing the first IN_DP into the idle state in response to sensing the idle state of the first OUT_DP; and enabling the first IN_DP after the idle state at a second datapath speed.

7. The method of claim 1, further comprising:

setting a timer in connection with transmitting the first code;

asserting an interrupt indicating that the link is down, if the timer expires prior to receiving the second code.

8. The method of claim 7, wherein the first and second codes comprise three consecutive //Q// codes, the //Q// codes defined by an Institute of Electrical and Electronics Engineers ("IEEE") 802.3 Standard, Clause 48.

9. The method of claim 1, further comprising:

negotiating a link speed of the link with the physical medium; and setting the second datapath speed based on the link speed negotiated with the physical medium.

10. The method of claim 1, further comprising communicating to the MAC unit that the PHY unit is capable of both the first datapath speed and the second datapath speed via a status register within the PHY unit.

11. The method of claim 1, wherein the initiator unit comprises a media access control ("MAC") unit and the follower unit comprises a physical layer ("PHY") unit to couple to the physical medium.

12. A network interface, comprising:

a media access control ("MAC") unit including first transmit datapaths ("TXDPs") and first receive datapaths ("RXDPs");

an physical layer ("PHY") unit to couple to a physical medium to communicate data over the physical medium, the PHY unit including second TXDPs and second RXDPs; and a bi-directional link coupling the first TXDPs and RXDPs of the MAC unit to the second TXDPs and RXDPs of the PHY unit, respectively, the MAC and PHY units configured to route the data along all of the first and second TXDPs and RXDPs during a first mode of operation and to route the data along only one of the first and second TXDPs and only one of the first and second RXDPs while idling remaining TXDPs and RXDPs during a second mode of operation, and wherein at least one of the MAC unit and the PHY unit is configured to initiate a change between the first and second modes of operation by transmitting a code across the bi-directional link, wherein the second mode of operation comprises a slower link speed for the bi-directional link than the first mode of operation, wherein the MAC unit includes a first sense unit coupled to the first RXDPs to sense when the PHY unit places the second RXDPs into an idle state, and wherein the PHY unit each include a second sense unit coupled to the second TXDPs to sense when the MAC unit places the first TXDPs into the idle state, wherein the PHY unit includes a status register, the status register accessible by the MAC unit to determine capabilities of the PHY unit, wherein the status register includes:

a first bit to indicate whether PHY unit capable of the first mode of operation;

a second bit to indicate whether the PHY unit is capable of the second mode of operation; and a third bit to indicate whether the PHY unit is capable of auto-configuration for automatically switching between the first mode of operation and the second mode of operation, a fourth bit to indicate the PHY unit has all of the second RXDPs and TXDPs enabled during the first mode of operation;

a fifth bit to indicate whether the PHY unit is capable of communicating across the bi-directional link having only a two lane bus coupling the first TXDPs and RXDPs of the MAC unit to the second TXDPs and RXDPs of the PHY unit, respectively; and a sixth bit to indicate the PHY unit only has one of the second RXDP and TXDPs enabled during the second mode of operation.

13. The network interface of claim 12, wherein the idle state comprises one of an electrical idle state and a high impedance state.

14. The network interface of claim 12, wherein the first mode of operation comprises a 10 Gbps link speed with the physical medium and the second mode of operation comprise a 1 Gbps link speed with the physical medium.

15. The network interface of claim 14, further comprising transmitting the code three times to initiate the speed change, and wherein the code comprises a //Q// code sequence defined by an Institute of Electrical and Electronics Engineers ("IEEE") 802.3 Standard, Clause 48.

* * * * *

UNITED STATES PATENT AND TRADEMARK OFFICE
CERTIFICATE OF CORRECTION

PATENT NO. : 7,668,194 B2　　　　　　　　　　　　　　　　　　　　　Page 1 of 1
APPLICATION NO. : 11/020945
DATED : February 23, 2010
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1056 days.

Signed and Sealed this

Twenty-eighth Day of December, 2010

David J. Kappos
*Director of the United States Patent and Trademark Office*